United States Patent [19]

Lindner

[11] 3,862,057

[45] Jan. 21, 1975

[54] MOLDING COMPOUNDS WITH EPOXY RESIN BASE

[75] Inventor: Heinz-Joachim Lindner, Nurnberg, Germany

[73] Assignee: Siemens Aktiengesellschaft, Munchen, Germany

[22] Filed: Nov. 15, 1972

[21] Appl. No.: 306,617

[30] Foreign Application Priority Data
Nov. 15, 1971 Germany............................ 2156700

[52] U.S. Cl............... 252/516, 252/511, 260/37 EP
[51] Int. Cl. ........................ H01b 1/04, C08g 51/04
[58] Field of Search.......... 252/511, 516; 260/37 EP

[56] References Cited
UNITED STATES PATENTS
3,153,636   10/1964   Shanta et al.................... 252/516 X

*Primary Examiner*—Stephen J. Lechert, Jr.
*Assistant Examiner*—R. E. Schafer
*Attorney, Agent, or Firm*—Kenyon & Kenyon Reilly Carr & Chapin

[57] ABSTRACT

The invention concerns flowable molding compounds for the manufacture of moldings with defined electrical conductivity, and which moldings contain epoxy compounds of multivalent phenols. Of particular importance are moldings which contain re-purified epoxy resins with a chlorine content of less than 0.1% by weight, and preferably 0.05% by weight, aromatic diamines and pure silicon carbide, in addition to customary fillers.

4 Claims, No Drawings

MOLDING COMPOUNDS WITH EPOXY RESIN BASE

BACKGROUND OF THE INVENTION

Molding compounds are known which are hardened or set or cured by heat. Such molding compounds contain epoxy resins and the hardeners required for reaction with the former, for instance, amines or acid anhydrides.

Depending on the use of the molding compounds, defined requirements are placed on them. Epoxy-resin molding compounds for electrical components must exhibit definite electrical properties. Thus, rings for the quenching air gap in high-voltage circuit breakers, for instance, should have a defined electrical resistance, and their manufacture should be as simple as possible. The insulation resistance of the cured molding compound is to be $10^9$ to $10^{10}$ ohm.

It is known that through the addition of electrically conductive fillers or reinforcement materials, conductive plastic compounds can be produced. One can thereby also obtain compounds with a defined conductivity. Such compounds, however, are not suited for the application mentioned above, since with the high voltages occurring in such uses, i.e., over 5 kV, partial electrical breakdown takes place.

Thereby, formation of soot or carbon, respectively, frequently occurs and required semi-conducting properties of materials are degraded. The carbon formed changes with time, i.e., it ages and is no longer high-voltage resistant.

It is further known to use epoxy casting resins with silicon carbide as the filler for certain applications. With the long curing times usually required, it is however, found that due to the great difference in the density of the resin and the filler, sedimentation of the silicon carbide occurs and parts manufactured therefrom exhibit highly differing electrical properties.

BRIEF SUMMARY OF THE INVENTION

Surprisingly, it has been found that molding compounds with defined electrical conductivity, which molding compounds are based on epoxy resins, customary powdered filler materials as well as amines as hardening agents, can be obtained if they contain, in accordance with the invention, pure silicon carbide. These are flowable epoxy-resin molding compounds.

DETAILED DESCRIPTION

Preferably, epoxy compounds with more than one epoxy group per mol are used, for instance, polyglycidyl ethers of multivalent phenols, such as diphenylolpropane ("bisphenol A"), diphenylolmethane, polyglycidyl ethers of oxyarylcarbon acids. It is also possible to use mixtures of the above-mentioned polyepoxies with each other.

According to a preferred embodiment of the invention, re-purified epoxy resins with a chlorine content of maximally 0.1% by weight, and preferably, less than 0.05% by weight, are used. Such epoxy resins, as described, which contain a chlorine content of less than 0.1% by weight of the resin, and which are useful in the present invention are commercially available.

The reaction of the different epoxy compounds can in principle take place with any multivalent amines which possess at least two hydrogen atoms which are capable of reacting with epoxy groups, such as, for instance, aromatic multivalent amines, particularly 4,4'-diaminodiphenylsulfone, and phenylene diamine which can be partially alkylized, either each alone or as a mixture of at least two of them.

The compounds can be set either at room temperature or also at elevated temperature. The multivalent amines used are applied here preferably in such amounts that always one oxide group is present for each amine hydrogen atom.

It is further within the scope of the present invention that the compounds described have customary additives, such as for instance, pigments, fillers and lubricants. As fillers can be used, for instance, glass fibers, mica, quartz powder, chalk, kaolin or finely distributed silica (Aerosil). The filler content, based on the weight of the molding compound, may be up to 90 percent or greater; however 70 percent is a more useful proportion and 50 percent is preferred. Lesser proportions may be used if desired.

A particularly advantageous mixture is composed of 100 parts by weight of an epoxy resin of bisphenol A (para, Para'-isopropylidenediphenol) which may be also a re-purified epoxy resin with a maximum chlorine content of 0.1% by weight, 24 parts by weight of an aromatic diamine, 16 parts by weight of filler and 110 parts by weight of pure silicon carbide.

Products made from molding compounds according to the invention, for instance, moldings, exhibit a distinct improvement over the known products with respect to the homogeneity of the silicon carbide distribution. At the same time, the electrical conductivity is improved. If re-purified epoxy resin is used, the danger of corrosive decomposition products is, furthermore, reduced. On the basis of the favorable properties, particularly the defined electrical conductivity, insulating rings for high-voltage circuit breakers, cathode drop arresters, for instance, are manufactured from the molding compounds according to the invention.

The proportion of ingredients are set forth in the following table. The general range indicates the limits, greater than which on the upper side, no appreciable improvement is observed, and on the lower side, the improvements of the instant invention are not observed. The Preferred range indicates that preferred for the invention.

TABLE I

| Range | Parts by Weight for 100 Parts by Weight of Epoxy Resin | |
|---|---|---|
| | Hardener | Silicon Carbide |
| General | 5–50 | 50–300 |
| Preferred | 20–30 | 100–200 |

The invention will be explained further by means of the following examples in which the parts are by weight unless otherwise indicated.

EXAMPLE 1

200 parts by weight of epoxy resin with an epoxy number of 0.51 to 0.53 are thoroughly mixed at 50°C. to 55°C. with 48 parts by weight of 4,4'-diaminodiphenylmethane, 2.5 parts by weight of zinc stearate as a lubricant, 50 parts by weight of surface-treated chalk as a wear-reducing additive, 2.0 parts by weight of highly dispersed silica and 250 parts by weight of pure silicon carbide. Pigments may be added.

The still castable mixture is poured to form a flat cake. After 24 to 36 hours at room temperature the mixture is hard and can be comminuted by known methods.

This compound can be molded at 150°C. to 160°C. and a curing time of 90 seconds per mm of wall thickness to make moldings with good mechanical strength and an electrical resistance of from 1 to 5 × $10^9$ ohm.

EXAMPLE 2

312 parts by weight of re-purified epoxy resin with an epoxy number of 0.55 to 0.58 and a chlorine content of less than 0.1% by weight are thoroughly mixed at 45°C. to 55°C. with 88 parts by weight of 4,4'-diaminodiphenylmethane, 2.5 parts by weight of zinc stearate as a lubricant, 80.5 parts by weight of a surface-treated chalk as a wear-reducing additive, 1.5 part by weight of highly dispersed silica and 500 parts by weight of silicon carbide. Pigments may be added.

The castable compound is poured to form a flat cake. After 24 to 36 hours at room temperature the mixture is hard. Comminution can take place by known methods.

This compound can be molded at 150°C. to 160°C. and a curing time of 90 seconds per mm of wall thickness to make molded parts with an electrical resistance of about 5 × $10^9$ ohm.

It will be understood that it is intended to cover all changes and modifications of the examples of the invention herein chosen for the purpose of illustration which do not constitute departures from the spirit and scope of the invention.

I claim:

1. Molding composition comprising:
   a. 100 parts by weight of re-purified epoxy compound having a maximum chlorine content of 0.1% by weight and having more than one epoxy group, and being selected from the group consisting of polyglycidyl ethers of para,para'-isopropylidenediphenol, diphenylolpropane, diphenylolmethane and oxyarylcarbon acids, and mixtures thereof;
   b. between about 10 to 50 parts by weight of powdered filler material;
   c. between about 5 to 50 parts by weight of amine hardener for said epoxy compound; and
   d. between about 100 to 200 parts by weight of pure silicon carbide.

2. The composition of claim 1 wherein said epoxy compound is polyglycidyl ether of para,para'-isopropylidenediphenol and has a maximum chlorine content of 0.05% by weight.

3. The method of making a molding composition comprising the steps of admixing:
   a. 100 parts by weight of re-purified epoxy compound having a maximum chlorine content of 0.1% by weight and having more than one epoxy group, and being selected from the group consisting of polyglycidyl ethers of para,para'-isopropylidenediphenol, diphenylolpropane, diphenylolmethane and oxyarylcarbon acids, and mixtures thereof;
   b. between about 10 to 50 parts by weight of powdered filler material;
   c. between about 5 to 50 parts by weight of amine hardener for said epoxy compound; and
   d. between about 100 to 200 parts by weight of pure silicon carbide.

4. The method of claim 3 wherein said epoxy compound is polyglycidyl ether of para,para'-isopropylidenediphenol and has a maximum chlorine content of 0.05% by weight.

* * * * *